United States Patent
Ito

(10) Patent No.: US 11,597,801 B2
(45) Date of Patent: Mar. 7, 2023

(54) METHOD FOR PRODUCING AROMATIC POLYSULFONE

(71) Applicant: Sumitomo Chemical Company, Limited, Tokyo (JP)

(72) Inventor: Kazuyuki Ito, Tsukuba (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 765 days.

(21) Appl. No.: 16/343,911

(22) PCT Filed: Oct. 24, 2017

(86) PCT No.: PCT/JP2017/038307
§ 371 (c)(1),
(2) Date: Apr. 22, 2019

(87) PCT Pub. No.: WO2018/079531
PCT Pub. Date: May 3, 2018

(65) Prior Publication Data
US 2019/0256660 A1    Aug. 22, 2019

(30) Foreign Application Priority Data
Oct. 26, 2016  (JP) .............................. JP2016-209245

(51) Int. Cl.
| | | |
|---|---|---|
| C08G 75/20 | (2016.01) | |
| C08K 3/013 | (2018.01) | |
| C08K 3/04 | (2006.01) | |
| C08K 3/34 | (2006.01) | |
| C08K 3/40 | (2006.01) | |
| C08K 7/06 | (2006.01) | |
| C08K 7/10 | (2006.01) | |
| C08K 7/14 | (2006.01) | |
| C08G 65/40 | (2006.01) | |

(52) U.S. Cl.
CPC ............. *C08G 75/20* (2013.01); *C08G 65/40* (2013.01); *C08K 3/013* (2018.01); *C08K 3/04* (2013.01); *C08K 3/34* (2013.01); *C08K 3/40* (2013.01); *C08K 7/06* (2013.01); *C08K 7/10* (2013.01); *C08K 7/14* (2013.01)

(58) Field of Classification Search
CPC .................................................... C08G 75/20
See application file for complete search history.

(56) References Cited

U.S. PATENT DOCUMENTS

| | | | |
|---|---|---|---|
| 8,686,075 B2 | 4/2014 | Gallucci et al. | |
| 2006/0089433 A1* | 4/2006 | Hugi ...................... | C08K 5/357 524/87 |
| 2011/0224386 A1 | 9/2011 | Weber et al. | |
| 2011/0311816 A1* | 12/2011 | Kanomata ............. | C08G 75/23 428/402 |
| 2013/0109831 A1 | 5/2013 | Lutz et al. | |
| 2015/0126635 A1 | 5/2015 | Liedloff et al. | |
| 2018/0371171 A1 | 12/2018 | Kohinata | |

FOREIGN PATENT DOCUMENTS

| | | |
|---|---|---|
| CN | 103732652 A | 4/2014 |
| CN | 103992472 A | 8/2014 |
| EP | 2189487 A1 | 5/2010 |
| JP | 62-502406 A | 9/1987 |
| JP | 01-318040 A | 12/1989 |
| JP | 02-016122 A | 1/1990 |
| JP | 04-359021 A | 12/1992 |
| JP | 05-163352 A | 6/1993 |
| JP | 2002-504603 A | 2/2002 |
| JP | 2012-509375 A | 4/2012 |
| JP | 2012211290 A | 11/2012 |
| JP | 2012211291 A | 11/2012 |
| JP | 2013159630 A | 8/2013 |
| JP | 2013159641 A | 8/2013 |
| JP | 2013221071 A | 10/2013 |
| WO | 86/04905 A1 | 8/1986 |
| WO | 99/43731 A2 | 9/1999 |
| WO | 2017/099080 A1 | 6/2017 |

OTHER PUBLICATIONS

Int'l Search Report dated Nov. 21, 2017 in Int'l Application No. PCT/JP2017/038307.
Office Action dated Feb. 22, 2021 in EP Application No. 17864697.2.
Office Action dated Feb. 23, 2021 in IN Application No. 201947015895.
Extended European Search Report dated Apr. 22, 2020 in EP Application No. 17864697.2.
Office Action dated Sep. 27, 2021 in KR Application No. 1020197011331 (with English Machine Translation).
Office Action dated Aug. 30, 2021 in CN Application No. 201780065663.3 (with English Machine Translation).
Office Action dated Jan. 20, 2022 in KR Application No. 1020217038689 (with English Machine Translation).
Office Action dated Jul. 26, 2022 in KR Application No. 10-2021-7038689 (with English Machine Translation).

* cited by examiner

*Primary Examiner* — Megan McCulley
(74) *Attorney, Agent, or Firm* — Panitch Schwarze Belisario & Nadel LLP

(57) ABSTRACT

A method for producing an aromatic polysulfone by a polycondensation reaction between an aromatic dihalogenosulfone compound and an aromatic dihydroxy compound is described. The polycondensation reaction is performed in the presence of at least one aromatic end-capping agent; and an amount, p mol, of the aromatic dihalogenosulfone compound, an amount, q mol, of the aromatic dihydroxy compound, and an amount, r mol, of the aromatic end-capping agent have a relationship satisfying formula (S1) below and formula (S2) below:

$r/(p-q)<2$     (S1), and $p>q$     (S2).

11 Claims, No Drawings

METHOD FOR PRODUCING AROMATIC POLYSULFONE

CROSS-REFERENCE TO RELATED APPLICATIONS

This application is a Section 371 of International Application No. PCT/JP2017/038307, filed Oct. 24, 2017, which was published in the Japanese language on May 3, 2018 under International Publication No. WO 2018/079531 A1, which claims priority under 35 U.S.C. § 119(b) to Japanese Application No. 2016-209245, filed on Oct. 26, 2016, the disclosures of which are incorporated herein by reference in their entireties.

TECHNICAL FIELD

The present invention relates to a method for producing an aromatic polysulfone, an aromatic polysulfone and an aromatic polysulfone composition.

BACKGROUND ART

An aromatic polysulfone is excellent in heat resistance and chemical resistance and, therefore, is used as a material for producing molded articles. An aromatic polysulfone is usually produced by subjecting an aromatic dihalogenosulfone compound and an aromatic dihydroxy compound to a polycondensation reaction in the presence of a base and a reaction solvent (for example, Patent Document 1). As a consequence, the aromatic polysulfone obtained by a polycondensation reaction of an aromatic dihalogenosulfone compound with an aromatic dihydroxy compound has a halogen atom or a phenolic hydroxyl group at its end(s).

In recent years, movement toward regulation of halogen materials generating harmful substances at the time of burning has been becoming active due to environmental considerations. Particularly, in applications to electrical/electronic parts, the regulation is becoming stringent, and there is a demand to suppress the halogen atom content of the molded articles to about 1000 ppm or less.

In conventional aromatic polysulfones having halogen atoms at ends thereof, the halogen atom content is usually about several thousands ppm; therefore, such conventional aromatic polysulfones are not suitable for the aforementioned applications. On the other hand, aromatic polysulfones having phenolic hydroxyl groups at ends thereof contain less amount of halogen atoms, but have insufficient thermal stability; for example discoloration is likely to occur when heated.

As a method for reducing the halogen atom content of the aromatic polysulfone having halogen atoms at ends thereof, a method in which the halogen atoms at ends of the aromatic polysulfone are substituted with a compound free of a halogen atom known. In the production methods described in Patent Documents 2 and 3, in view of the difference in amount between the aromatic dihalogenosulfone compound and the aromatic dihydroxy compound, two or more equivalents of a compound substituting the halogen atoms at the ends of the aromatic polysulfone are used to thereby reduce the halogen atom content of the aromatic polysulfone.

PRIOR ART REFERENCES

Patent Document

Patent Document 1: Japanese Unexamined Patent Application Publication (Translation of PCT Application) No. 2012-509375

Patent Document 2: Japanese Unexamined Patent Application, First Publication No. Hei 1-318040

Patent Document 3: Japanese Unexamined Patent Application, First Publication No. Hei 5-163352

DISCLOSURE OF INVENTION

Problems to be Solved by the Invention

However, the aromatic polysulfones obtained by the methods described in Patent Documents 2 and 3 have a problem that the heat resistance is lower than that of the conventional aromatic polysulfone having halogen atoms at ends thereof.

The present invention has been made in view of the above circumstances, and an object thereof is to provide a method for producing an aromatic polysulfone having a low halogen atom content and excellent heat resistance. Another object of the present invention is to provide an aromatic polysulfone and an aromatic polysulfone composition, each having a low halogen atom content and excellent heat resistance.

Means to Solve the Problems

For solving the aforementioned problems, the present invention in one aspect thereof provides a method for producing an aromatic polysulfone by a polycondensation reaction between an aromatic dihalogenosulfone compound and an aromatic dihydroxy compound, wherein: the polycondensation reaction is performed in the presence of at least one aromatic end-capping agent; and an amount, p mol, of the aromatic dihalogenosulfone compound, an amount, q mol, of the aromatic dihydroxy compound, and an amount, r mol, of the aromatic end-capping agent have a relationship satisfying formula (S1) below and formula (S2) below:

$$r/(p-q)<2 \qquad (S1); \text{ and}$$

$$p>q \qquad (S2).$$

In the method according to one embodiment of the present invention, the aromatic dihalogenosulfone compound is preferably bis(4-chlorophenyl)sulfone.

In the method according to one embodiment of the present invention, it is preferable that a relationship represented by formula (S3) below defining a narrower range than a range defined by the formula (S1) is satisfied:

$$0.5 \leq r/(p-q) \leq 1.5 \qquad (S3)$$

In the method according to one embodiment of the present invention, it is preferable that the polycondensation reaction is carried out in a presence of an organic solvent including diphenylsulfone.

The present invention in another embodiment provides an aromatic polysulfone including repeating units represented by formula (1) below, and satisfying requirements (A) and (B) below:

$$-Ph^1-SO_2-Ph^2-O- \qquad (1),$$

wherein each of $Ph^1$ and $Ph^2$ represents a phenylene group, and one or more hydrogen atoms of the phenylene group are each independently substituted by or not substituted by an alkyl group having 1 to 10 carbon atoms, an aryl group having 6 to 20 carbon atoms a halogen atom;

(A): a halogen atom content is 1000 ppm by mass or less; and (B): the aromatic polysulfone has a yellowness index, YI, of not more than 20, as measured based on light transmission according to ASTM D 1925, and an absolute value of change in the yellowness index (ΔYI) caused by heating the aromatic polysulfone in air at 350° C. for 1 hour is 15 or less.

In the aromatic polysulfone according to one embodiment of the present invention, it is preferable that the halogen atom is a chlorine atom.

In the aromatic polysulfone according to one embodiment of the present invention, it is preferable that the aromatic polysulfone has 0.01 to 0.8 phenolic hydroxyl group per 100 repeating units represented by the formula (1).

The present invention in still another embodiment provides an aromatic polysulfone composition including the aforementioned aromatic polysulfone and a filler.

[1] A method for producing an aromatic polysulfone by a polycondensation reaction between an aromatic dihalogenosulfone compound and an aromatic dihydroxy compound, wherein: the polycondensation reaction is performed in a presence of at least one aromatic end-capping agent; and an amount, p mol, of the aromatic dihalogenosulfone compound, an amount, q mol, of the aromatic dihydroxy compound, and an amount, r mol, of the aromatic end-capping agent have a relationship satisfying formula (S1) below and formula (S2) below:

$$r/(p-q) < 2 \quad (S1); \text{ and}$$

$$p > q \quad (S2).$$

[2] The method according to [1], wherein the aromatic dihalogenosulfone compound is bis(4-chlorophenyl)sulfone.

[3] The method according to [1] or [2], which a relationship represented by formula (S3) below defining a narrower range than a range defined by the formula (S1) is satisfied:

$$0.5 \leq r/(p-q) \leq 1.5 \quad (S3).$$

[4] The method according to any one of [1] to [3], wherein the polycondensation reaction is carried out in a presence of an organic solvent comprising diphenylsulfone.

[5] An aromatic polysulfone comprising repeating units represented by formula (1) below, and satisfying requirements (A) and (B) below:

-Ph$^1$-SO$_2$-Ph$^2$-O— (1), wherein each of Ph$^1$ and Ph$^2$ represents a phenylene group, and one or more hydrogen atoms of the phenylene group are each independently substituted by or not substituted by an alkyl group having 1 to 10 carbon atoms, an aryl group having 6 to 20 carbon atoms or a halogen atom;
(A): a halogen atom content is 1000 ppm by mass or less; and
(B): the aromatic polysulfone has a yellowness index, YI, of not more than 20, as measured based on light transmission according to ASTM D 1925, and an absolute value of change in the yellowness index (ΔYI) caused by heating the aromatic polysulfone in air at 350° C. for 1 hour is 15 or less.

[6] The aromatic polysulfone according to [5], wherein the halogen atom is a chlorine atom.

[7] The aromatic polysulfone according to [5] or [6], which has 0.01 to 0.8 phenolic hydroxyl group per 100 repeating units represented by the formula (1).

[8] An aromatic polysulfone composition comprising the aromatic polysulfone according to any one of [5] to [7] and a filler.

Effect of the Invention

The present invention in one embodiment can provide a method for producing an aromatic polysulfone having a low halogen atom content and excellent heat resistance. The present invention can also provide an aromatic polysulfone and an aromatic polysulfone composition, each having a low halogen atom content and excellent heat resistance.

DESCRIPTION OF THE EMBODIMENTS

<Method for Producing Aromatic Polysulfone>

In method of the present embodiment, an aromatic polysulfone is produced by a polycondensation reaction between an aromatic dihalogenosulfone compound and an aromatic dihydroxy compound. The polycondensation reaction is performed in the presence of at least one aromatic end-capping agent. Further, in the aromatic polysulfone production method, an amount, p mol, of the aromatic dihalogenosulfone compound, an amount, q mol, of the aromatic dihydroxy compound, and an amount, r mol, of the aromatic end-capping agent have a relationship satisfying formula (S1) below and formula (S2) below. In the present specification, the "aromatic end-capping agent" refers to an aromatic compound which substitutes halogen atoms at the ends of the aromatic polysulfone with other functional groups.

$$r/(p-q) < 2 \quad (S1); \text{ and}$$

$$p > q \quad (S2).$$

When the aromatic dihalogenosulfone compound and the aromatic dihydroxy compound are reacted with the relationship satisfying p>q, the theoretical amount of the halogen atoms in the aromatic polysulfone is (p−q)×2 from the values of p and q. It has conventionally been considered that, for sufficiently reacting halogen atoms with the end-capping agent in exact stoichiometric amounts in order to reduce the halogen atom content of the aromatic polysulfone, r is preferred to be larger than (p−q)×2, namely r>(p−q)×2. However, the aromatic polysulfone produced under conditions such that r becomes larger than (p−q)×2 has a problem that the heat resistance is low as compared to the aromatic polysulfone having halogen atoms at ends thereof produced in the absence of the aromatic end-capping agent.

The present inventors conducted intensive and extensive studies on the amount (r) of the end-capping agent, and as a result, found that the aromatic polysulfone produced under the condition such that r is less than (p−q)×2 has a sufficiently low halogen atom content and excellent heat resistance as well.

A reaction between p mol of the aromatic dihalogenosulfone compound and q mol of the aromatic dihydroxy compound in the presence of r mol of the end-capping agent results in the presence of 2 p mol of halogen atoms and 2 q+r mol of hydroxy groups in the reaction system. Therefore, if (p−q)×2=r, all the halogen atoms react with the hydroxy groups theoretically. Meanwhile, if (p−q)×2>r, theoretically, the halogen atoms remain unreacted, and if (p−q)×2<r, theoretically, the hydroxy groups remain unreacted. Here, conversion of 2p−2q<r gives r/(p−q)>2. That is, the condition that gives r/(p−q)>2, which was conventionally thought to be preferable, can be said to be a condition that allows the hydroxy groups to remain. Therefore, as far as the production of an aromatic polysulfone under such an condition is concerned, while the halogen atom content is reduced, an aromatic polysulfone having hydroxyl groups (phenolic hydroxyl groups) is by-produced, and it is considered that other by-products such as by-products of low molecular weight are also generated as a result of addition of excess amount of the end-capping agent. These are considered to the reasons for the decreased heat resistance of the resulting aromatic polysulfone.

For more sufficiently reducing the halogen atom content of the obtained aromatic polysulfone, the value of r/(p−q) is preferably 0.5 or more, more preferably 0.7 or more, more preferably 0.8 or more, still more preferably 0.9 or more, and particularly preferably 1.0 or more. The value of r/(p−q) may be 1.1 or more, or 1.2 or more. For further increasing the heat resistance, the value of r/(p−q) is preferably 1.8 or less, more preferably 1.7 or less, still more preferably 1.6 or less, and particularly preferably 1.5 or less. The value of r/(p−q) may be 1.4 or less, or 1.3 or less. The upper limit value and the lower limit value of r/(p−q) can arbitrarily be combined. That is, in the method of the present embodiment, it is preferable that the following formula (S3) is satisfied.

$$0.5 \leq r/(p-q) \leq 1.5 \tag{S3}$$

[Monomer]

The aromatic dihalogenosulfone compound and the aromatic dihydroxy compound correspond to the repeating units constituting the aromatic polysulfone. The aromatic dihalogenosulfone compound is not particularly limited as long as it is a compound having an aromatic ring, a sulfonyl group (—SO$_2$—) and two halogeno groups in one molecule. Further, the aromatic dihydroxy compound is not particularly limited as long as it is a compound having an aromatic ring and two hydroxy groups in one molecule. The aromatic ring may be monocyclic, polycyclic, or aromatic heterocyclic. The aromatic heterocycle contains nitrogen, oxygen, or sulfur in the aromatic ring.

The aromatic polysulfone of the present embodiment can be produced by using a compound represented by the formula (4) (hereinafter also referred to as "compound (4)") as an aromatic dihalogenosulfone compound and compounds represented by the formulae (5) to (7) (hereinafter also referred to as "compounds (5) to (7)") the aromatic dihydroxy compound.

$$X^1\text{-Ph}^1\text{-SO}_2\text{-Ph}^2\text{-}X^2 \tag{4}$$

wherein each of X$^1$ and X$^2$ independently represents a halogen atom; and each of Ph$^1$ and Ph$^2$ represents a phenylene group, and one or more hydrogen atoms of the phenylene group are each independently substituted by or not substituted by an alkyl group having 1 to 10 carbon atoms, an aryl group having 6 to 20 carbon atoms or a halogen atom.

HO—Ph$^1$—SO$_2$—Ph$^2$—OH (5)

wherein Ph$^1$ and Ph$^2$ are as defined above.

HO—Ph$^3$—R$^1$—Ph$^4$—OH (6)

wherein each of Ph$^3$ and Ph$^4$ represents a phenylene group, and one or more hydrogen atoms of the phenylene group are each independently substituted by or not substituted by an alkyl group having 1 to 10 carbon atoms, an aryl group having 6 to 20 carbon atoms or a halogen atom; and R$^1$ is an alkylidene group having 1 to 5 carbon atoms, an oxygen atom or a sulfur atom.

HO—(Ph$^5$)$_n$—OH (7)

wherein Ph$^5$ represents a phenylene group, and one or more hydrogen atoms of the phenylene group are each independently substituted by or not substituted by an alkyl group having 1 to 10 carbon atoms, an aryl group having 6 to 20 carbon atoms or a halogen atom; and n is an integer of 1 to 3, with the proviso that, when n is 2 or more, a plurality of Ph$^5$ may be the same or different.

In the compound (4), each of X$^1$ and X$^2$ independently represents a halogen atom, and examples thereof include those which may substitute the hydrogen atoms of the phenylene group.

Each of the phenylene groups represented by Ph$^1$ to Ph$^5$ may independently be a p-phenylene group, a m-phenylene group, or an o-phenylene group, but is preferably a p-phenylene group.

Examples of the alkyl group having 1 to 10 carbon atoms which may substitute the hydrogen atoms of the phenylene group include a methyl group, an ethyl group, a n-propyl group, an isopropyl group, a n-butyl group, an isobutyl group, a sec-butyl group, a tert-butyl group, a n-pentyl group, a n-hexyl group, a n-heptyl group, a 2-ethylhexyl group, a n-octyl group and a n-decyl group.

Examples of the aryl group having 6 to 20 carbon atoms which may substitute the hydrogen atoms of the phenylene group include a phenyl group, an o-tolyl group, a m-tolyl group, a p-tolyl group, a 1-naphthyl group and a 2-naphthyl group.

Examples of the halogen atom which may substitute the hydrogen atoms of the phenylene group include a fluorine atom, a chlorine atom, a bromine atom and an iodine atom.

When the hydrogen atom(s) of the phenylene group is replaced with any of these substituent groups (or atoms), the number of the substituent groups (or atoms) for each phenylene group is independently preferably 2 or less, more preferably 1.

Examples of the alkylidene group having 1 to 5 carbon atoms represented by R$^1$ include a methylene group, an ethylidene group, an isopropylidene group and a butylidene group.

Examples of the compound (4) include bis(4-chlorophenyl) sulfone and 4-chlorophenyl-3',4'-dichlorophenyl sulfone, of which bis(4-chlorophenyl) sulfone is preferable.

Examples of the compound (5) include bis(4-hydroxyphenyl) sulfone, bis(4-hydroxy-3,5-dimethylphenyl) sulfone and bis(4-hydroxy-3-phenylphenyl) sulfone.

Examples of the compound (6) include 2,2-bis(4-hydroxyphenyl) propane, 2,2-bis(4-hydroxyphenyl) hexafluoropropane, bis(4-hydroxyphenyl) sulfide, bis(4-hydroxy-3-methylphenyl) sulfide and bis(4-hydroxyphenyl) ether.

Examples of the compound (7) include hydroquinone, resorcin, catechol, phenylhydroquinone, 4,4'-dihydroxybiphenyl, 2,2'-dihydroxybiphenyl, 3,5,3',5'-tetramethyl-4,4'-dihydroxybiphenyl, 2,2'-diphenyl-4,4'-dihydroxybiphenyl and 4,4'-dihydroxy-p-quaterphenyl. Among these, hydroquinone, resorcin, catechol, phenylhydroquinone, 2,2'-dihydroxybiphenyl, 3,5,3',5'-tetramethyl-4,4'-dihydroxybiphenyl, 2,2'-diphenyl-4,4'-dihydroxybiphenyl and 4,4'-dihydroxy-p-quaterphenyl are preferable.

Examples of the aromatic dihalogenosulfone compound other than the compound (4) include 4,4'-bis(4-chlorophenylsulfonyl) biphenyl.

In the present invention, the entire amount or a part of the aromatic dihalogenosulfone compound and the aromatic dihydroxy compound may be replaced by a compound having both a halogeno group and a hydroxy group in its molecule (for example, 4-hydroxy-4'-(4-chlorophenylsulfonyl)biphenyl).

In the present invention, depending on the type of aromatic polysulfone of interest, a single type of compound or multiple types of compounds may be used with respect to each of the aromatic dihalogenosulfone compound and the aromatic dihydroxy compound.

The aromatic end-capping agent is not particularly limited as long as it is a compound having one functional group capable of reacting with the halogen atom of the aromatic dihalogenosulfone compound. Examples of such a compound include compounds represented by the following formula (8), of which a compound represented by the formula (9) is preferable.

$$Ar-Y \qquad (8)$$

In the formula (8), Y represents —OH, —SH or $NH_2$, and Ar represents an aromatic group.

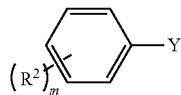
(9)

In the formula (9), Y is as defined above; $R^2$ is an alkyl group having 1 to 4 carbon atoms, an alkoxy group having 1 to 4 carbon atoms, a unsubstituted or substituted aromatic group having 5 to 10 carbon atoms, or a unsubstituted or substituted aromatic group having 5 to 10 carbon atoms which is bonded to the benzene ring via an oxygen atom, a sulfur atom or an imino group; and m represents an integer of 0 to 5.

Y is preferably —OH. That is, the aromatic end-capping agent is preferably an aromatic monohydroxy compound. When Y is —OH, an aromatic polysulfone having higher heat resistance is likely to be obtained.

The aromatic group Ar may be any of an aromatic hydrocarbon group, a heteroaromatic group, a polycyclic aromatic hydrocarbon group and a polycyclic heteroaromatic group. Each of the heteroaromatic group and the polycyclic heteroaromatic group contains nitrogen, oxygen, or sulfur in its aromatic ring(s). The aromatic group Ar is preferably an aromatic hydrocarbon group, more preferably an unsubstituted or substituted phenyl group, or an unsubstituted or substituted naphthyl group, arid particularly preferably an unsubstituted or substituted phenyl group. When Ar is an aromatic hydrocarbon group or a polycyclic aromatic hydrocarbon group, an aromatic polysulfone having higher heat resistance is likely to be obtained.

In the present specification, the aromatic group is not particularly limited as long as it is a group having at least one aromatic ring. That is, the concept of the "aromatic group" embraces a group in which further aromatic ring(s) is bonded to an aromatic ring, a group in which an aliphatic group is bonded to an aromatic ring, and so forth. Likewise, each of the "aromatic hydrocarbon group", the "heteroaromatic group", the "polycyclic aromatic hydrocarbon group" and the "polycyclic heteroaromatic group" also embraces a group in which at least one group mentioned above has, bonded thereto, other substituent group(s).

$R^2$ is preferably an alkyl group having 1 to 4 carbon atoms or an unsubstituted or substituted aromatic group having 5 to 10 carbon atoms.

The alkyl group represented by $R^2$ may be any of linear, branched and cyclic alkyl groups, but is preferably a linear or branched alkyl group, and examples thereof include a methyl group, an ethyl group, a n-propyl group, an isopropyl group, a n-butyl group, an isobutyl group, a sec-butyl group and a tert-butyl group.

The alkoxy group represented by $R^2$ may be any of linear, branched and cyclic alkoxy groups, but is preferably a linear or branched alkoxy group, and examples thereof include a methoxy group, an ethoxy group, a n-propoxy group, an isopropoxy group, a n-butoxy group, an isobutoxy group, a sec-butoxy group, and a tert-butoxy group.

Examples of the aromatic group represented by $R^2$ include the same groups as those described above for Ar.

When m is an integer of 2 to 5, a plurality of $R^2$ may be the same or different. For example, when m is an integer of 2 to 5, all of the $R^2$ groups may be the same or may be different from one another, or only some of the $R^2$ groups may be the same.

Alternatively, m may be an integer of 0 to 3 or an integer of 0 to 2, and is preferably 0.

As the aromatic end-capping agent, 4-phenylphenol, 1-naphthol, 2-naphthol and 4-phenoxyphenol are preferable because these compounds are not reactive to halogen atoms and do not have a structure which is likely to generate radicals, and are easily available.

The aromatic group Ar and the unsubstituted or substituted aromatic group $R^2$ having 5 to 10 carbon atoms preferably have their α-positions free of a CH bond, a phenolic hydroxyl group and an alkyl ether structure.

[Base]

The polycondensation reaction between the aromatic dihalogenosulfone compound and the aromatic dihydroxy compound is preferably carried out using an alkali metal carbonate as a base. It is preferable to carry out the polycondensation reaction in an organic solvent as a polycondensation solvent. It is more preferable to carry out the polycondensation reaction using an alkali metal carbonate as a base and in an organic solvent.

The alkali metal carbonate may be an alkali carbonate (carbonate of an alkali metal) which is a normal salt, an alkali bicarbonate (alkali hydrogen carbonate, hydrogen carbonate of an alkali metal) which is an acidic salt, or a mixture thereof (alkali carbonate and alkali bicarbonate). Preferable examples of the alkali carbonate include sodium carbonate, potassium carbonate and the like. Preferable examples of the alkali bicarbonate include sodium bicarbonate (sodium hydrogen carbonate), potassium bicarbonate (potassium hydrogen carbonate) and the like.

[Organic Solvent]

The polycondensation reaction between the aromatic dihalogenosulfone compound and the aromatic dihydroxy compound is preferably carried out in the presence of an organic solvent. The type of the organic solvent is not particularly limited, but it is preferable to use an aprotic polar solvent. The boiling point of the organic solvent is not particularly limited but, for example, is preferably 100° C. or higher and 400° C. or lower.

Examples of the organic solvent include sulfoxides such as dimethylsulfoxide; amides such as dimethylformamide, dimethylacetamide and N-methyl-2-pyrrolidone; sulfones such as sulfolane (i.e., 1,1-dioxothilane), dimethylsulfone, diethylsulfone, diisopropylsulfone and diphenylsulfone; compounds having a urea skeleton in which a hydrogen atom bonded to a nitrogen atom may be substituted.

Among these, as the organic solvent, dimethylsulfoxide, dimethylformamide, dimethylacetamide, N-methyl-2-pyrrolidone, sulfolane, diphenylsulfone and 1,3-dimethyl-2-imidazolidinone are preferable, and dimethylsulfoxide, dimethylformamide, dimethylacetamide, N-methyl-2-pyrrolidone, sulfolane and 1,3-dimethyl-2-imidazolidinone are more preferable, of which diphenylsulfone is even more preferable because the condensation reaction can be carried out at high temperature.

With respect to these organic solvents, a single type thereof may be used individually or two or more types thereof may be used in combination.

[Polymerization]

In the method for producing an aromatic polysulfone, as a first step, an aromatic dihalogenosulfone compound and an aromatic dihydroxy compound are dissolved in an organic solvent. As a second step, an alkali metal carbonate is added to the solution obtained in the first step to perform a polycondensation reaction between the aromatic dihalogenosulfone compound and the aromatic dihydroxy compound. As a third step, unreacted base, by-products (alkali halide when an alkali metal salt is used as a base), and the organic solvent are removed from the reaction mixture obtained in the second step, to thereby obtain an aromatic polysulfone. The end-cap agent may be added at an arbitrary time in the first step and the second step. For more easily stabilizing the quality of the obtained aromatic polysulfone, it is preferable to add the aromatic end-capping agent before initiating the polycondensation reaction in the second step.

The dissolving temperature in the first step is preferably 40° C. or higher and 180° C. or lower. The reaction temperature for the polycondensation the second step is preferably 180° C. or higher and 400° C. or lower.

The relationship between the blending amount p (mol) of the aromatic dihalogenosulfone compound and the blending amount q (mol) of the aromatic dihydroxy compound satisfies p>q. The "p/q" representing the relationship (blending ratio) between the amount p and the amount q is preferably 1.2 or less, and more preferably 1.1 or less. That is, the blending ratio of the aromatic dihalogenosulfone compound to the aromatic dihydroxy compound is preferably more than 100 mol % and 120 mol % or less, and more preferably more than 100 mol % and 110 mol % or less.

The ratio of the metal carbonate (in terms of the alkali metal) to the aromatic dihydroxy compound is preferably 90 mol % or more and 130 mol % or less, more preferably 95 mol % or more and 120 mol % or less.

The polycondensation reaction in the second step is generally carried out by gradually raising the temperature while removing by-produced water, and maintaining the temperature after reaching the reflux temperature of the organic solvent for preferably 1 hour or more and 50 hours or less, more preferably 2 hours or more and 30 hours or less.

In the third step, first, unreacted alkali metal carbonate said by-produced alkali halide are removed from the reaction mixture obtained in the second step by filtration, extraction, centrifugation or the like, thereby obtaining an aromatic polysulfone dissolved in an organic solvent. Then, by removing the organic solvent from this solution, an aromatic polysulfone is obtained.

In the present method, for example, the organic solvent may be removed directly from the aromatic polysulfone solution under reduced or increased pressure. Preferably, the solution is mixed with a poor solvent for the aromatic polysulfone to precipitate the aromatic polysulfone, followed by removing the organic solvent by filtration, centrifugation or the like. Further, it is preferable to obtain the aromatic polysulfone by repeatedly washing the above precipitate with the poor solvent.

Examples of the poor solvent for the aromatic polysulfone include methanol, ethanol, isopropyl alcohol, acetone, hexane, heptane and water, and water and methanol are preferable because they are inexpensive.

In the present embodiment, a single type of the poor solvent for the aromatic polysulfone may be used alone, or two or more types of the poor solvents may be used in combination.

According to one embodiment of the present invention, there is provided a method that enables production of an aromatic polysulfone having a low halogen atom content and excellent heat resistance.

<Aromatic Polysulfone>

The aromatic polysulfone in the present embodiment has repeating units (hereinafter also referred to as "repeating units (1)") represented by the following formula (1), and satisfies the following requirements (A) and (B). Such an aromatic polysulfone has a low halogen atom content and excellent heat resistance.

-Ph$^1$—SO$_2$—Ph$^2$—O—   (1), wherein Ph$^1$ and Ph$^2$ are as defined above.

(A): a halogen atom content is 1000 ppm by mass or less; and (B): the aromatic polysulfone has a yellowness index, YI, of not more than 20, as measured based on light transmission according to ASTM D 1925, and an absolute value of change in the yellowness index (ΔYI) caused by heating the aromatic polysulfone in air at 350° C. for 1 hour is 15 or less.

[Conditions]

Sample: N-methyl-2-pyrrolidone solution containing the aromatic polysulfone at a concentration of 10% by mass Optical path length: 1 cm Measurement mode: 0°, 0° method according to CIE No 15: 2004 (JIS Z 8722)

Light source: Halogen lamp C light source

Viewing angle: 2°

[Procedure]

N-methyl-2-pyrrolidone is placed in a quartz cell having an optical path length of 1 cm at room temperature and installed in a sample chamber of Colorimetric Color Difference meter "ZE-2000" manufactured by Nippon Denshoku Industries Co., Ltd., whereafter a baseline is measured. Next, the sample is placed in a quartz cell having an optical path length of 1 cm and installed in a sample chamber of Colorimetric Color Difference meter "ZE-2000", whereafter YI is measured.

The relationship between YI and XYZ tristimulus values in the case of using the C light source satisfies the following equation.

$$YI=100(1.2769X-1.0592)/Y$$

The aromatic polysulfone may further contain at least one type of other repeating units such as a repeating unit represented by the formula (2) (hereinafter also referred to as "repeating unit (2)") and a repeating unit represented by the formula (3) (hereafter also referred to as "repeating unit (3)"). Further, the aromatic polysulfone of the present embodiment preferably has a structural unit derived from an aromatic end-capping agent described later.

—Ph$^3$—R$^1$—Ph$^4$—O—   (2), wherein Ph$^3$, Ph$^4$ and R$^1$ are as defined above.

—(Ph$^5$)$_n$—O—   (3), wherein Ph$^5$ and n are as defined above.

The aromatic polysulfone contains the repeating units (4) in an amount of preferably 50 mol % or more, more preferably 80 mol % or more, relative to the total a (number of moles) of all repeating units constituting the aromatic polysulfone, and it is more preferable that the aromatic polysulfone is composed substantially only of the repeating units (1). The aromatic polysulfone may have two or more types of repeating units selected from the repeating units (1) to (3).

The reduced viscosity (unit: dL/g) of the aromatic polysulfone of the present embodiment is preferably 0.18 or more, more preferably 0.22 or more and 0.80 or less. The higher reduced viscosity of the aromatic polysulfone facilitates the improvement of its heat resistance and the strength and rigidity of molded articles produced therefrom; however, too high a reduced viscosity is likely to result in higher melting temperature and melt viscosity as well as lower flowability.

The YI is preferably 20 or less, more preferably 18 or less, even more preferably 15 or less, particularly preferably 12 or less, especially preferably 10 or less. The absolute value of $\Delta YI$ is preferably 15 or less, more preferably 14 or less, even more preferably 13 or less, particularly preferably 12 or less, especially preferably 11 or less. The aromatic polysulfone having the values of YI and $\Delta YI$ within the ranges specified above tends to have further improved heat resistance. The upper limit value of YI and the upper limit value of $\Delta YI$ can arbitrarily be combined.

With respect to the lower limit values of YI and $\Delta YI$, the lower, the more preferable. The lower limit values of YI and $\Delta YI$ are not particularly limited, but the lower limit value of YI is substantially 0.1 and the lower limit value of $\Delta YI$ is substantially 0.1.

One conceivable cause of the discoloration of the aromatic polysulfone after heating is the generation of radicals accompanying heating. It is considered that the level of $\Delta YI$ is influenced by the amount of coloring components induced by the generated radicals, namely $\Delta YI$ increases as the number of the generated radicals increases. That is, an aromatic polysulfone suffering less discoloration due to heating can be regarded as an aromatic polysulfone with less generation source of radicals, which suffers less occurrence of decomposition reaction accompanying radical generation or the like. That is, the aromatic polysulfone of the present embodiment is an aromatic polysulfone including a small amount of impurities (by-products) as sources of radicals and decomposition reactions, and small amounts of structures such as a CH bond, a phenolic hydroxyl group, and an alkyl ether structure at α-position. The high heat resistance of the aromatic polysulfone is considered to the result of such characteristic as described above.

Further, the aromatic polysulfone of the present embodiment is less likely to generate radicals, so that a crosslinking reaction due to radical generation is unlikely to occur. Therefore, the aromatic polysulfone of the present embodiment can suppress an increase in the melt viscosity due to crosslinking reaction.

Specifically, when the aromatic polysulfone of the present embodiment is heated, the change in melt viscosity thereof ($\Delta \eta$) is preferably 250 or less, more preferably 200 or less, even more preferably 155 or less. The lower limit value of the change in melt viscosity is not particularly limited, but is about 10 in practice. The change in melt viscosity ($\Delta \eta$) can be determined as follows. The aromatic polysulfone products, which have been heated at 360° C. for 5 minutes and 30 minutes, respectively, are extruded from a split die (inner diameter 1 mm, length 10 mm) under a load of 50 kg/cm$^2$, and the melt viscosities of the extruded aromatic polysulfone products are measured with a thermal flow evaluation device ("Flow Tester Model CFT 500" manufactured by Shimadzu Corporation). The melt viscosity of the aromatic polysulfone heated at 360° C. for 5 minutes is defined as $\eta_1$, and the melt viscosity of the aromatic polysulfone heated at 360° C. for 30 minutes is defined as $\eta_2$. Based on the determined $\eta_1$ and $\eta_2$, the change in the melt viscosity ($\Delta \eta$) is calculated by the following formula.

$\Delta \eta = \eta_2 - \eta_1$

The aromatic polysulfone of the present embodiment may contain a phenolic hydroxyl group, with the proviso that the number of phenolic hydroxyl group is 0.01 or more and 0.8 or less, or 0.1 or more and 0.7 or less, or 0.2 or more and 0.6 or less, per 100 repeating units represented by the above formula (1). When the amount of the phenolic hydroxyl group is within the above range, generation of radicals upon heating tends to be sufficiently suppressed. In the present specification, the term "phenolic hydroxyl group" possessed by the aromatic polysulfone denotes a hydroxyl group directly bonded to $Ph^1$ or $Ph^2$ in the above formula (1) representing the repeating units of the aromatic polysulfone.

The heat resistance of the aromatic polysulfone can be evaluated based on the 5% weight loss temperature of the aromatic polysulfone. The 5% weight loss temperature of the aromatic polysulfone can be obtained as a temperature when the weight of the aromatic polysulfone sample is reduced by 5%, which is determined from a TGA (Thermogravimetric analysis) curve obtained under predetermined conditions using a thermogravimetric analyzer ("TGA-50" manufactured by Shimadzu Corporation) with a reference temperature of 200° C.

In the aromatic polysulfone of the present embodiment, the 5% weight loss temperature is preferably 525° C. or more and 540° C. or less, more preferably 528° C. or more and 540° C. or less. When the 5% weight loss temperature of the aromatic polysulfone is 525° C. or more, a sufficient heat resistance can be obtained for melt molding. The upper limit value of the 5% weight loss temperature of the aromatic polysulfone is not particularly limited, but is about 540° C. in practice.

The aromatic polysulfone of the present embodiment can be obtained by a method for producing an aromatic polysulfone according to one embodiment of the present invention.

<Aromatic Polysulfone Composition>

The aromatic polysulfone composition of the present embodiment includes the aforementioned aromatic polysulfone and a filler. Further, the aromatic polysulfone composition may contain a resin other than the aromatic polysulfone, if necessary.

[Filler]

Examples of the filler contained in the aromatic polysulfone composition of the present embodiment include a fibrous filler, a plate filler, a spherical filler, a powder filler, an irregularly shaped filler, a whisker, and the like.

Examples of the fibrous filler include glass fiber, PAN type carbon fiber, pitch type carbon fiber, silica alumina fiber, silica fiber, alumina fiber, other ceramic fiber, liquid crystal polymer (LCP) fiber, aramid fiber, and polyethylene fiber. Also, whiskers such as wollastonite and potassium titanate fibers may be mentioned as well.

Examples of the plate filler include talc, mica, graphite, and wollastonite.

Examples of the spherical filler include glass beads and glass balloons.

Examples of the powder filler include calcium carbonate, dolomite, clay, barium sulphate, titanium oxide, carbon black, conductive carbon, fine particulate silica.

Examples of the irregularly shaped filler include glass flakes and glass fibers with irregular cross sections.

The amount of the filler is preferably more than 0 part by mass and 250 parts by mass or less, more preferably more than 0 part by mass and 70 parts by mass or less, even more preferably more than 0 part by mass and 50 parts by mass or less, particularly preferably more than 0 part by mass and 25 parts by mass or less, relative to 100 parts by mass of the aromatic polysulfone.

[Other Resins]

Examples of resins other than the aromatic polysulfone which may be contained in the aromatic polysulfone composition of the present embodiment include polyamide, polyester, polyphenylene sulfide, polycarbonate, polyphenylene ether, aroma polyketone, polyether imide, phenol resin, epoxy resin, polyimide resin, and modified products thereof.

The amount of the resin other than the aromatic polysulfone is preferably 5 to 2000 parts by mass, more preferably 10 to 1000 parts by mass, and still more preferably 20 to 500 parts by mass, based on 100 parts by mass of the aromatic polysulfone.

When aromatic polysulfone composition contains a resin other than the aromatic polysulfone, effects such as improvement of molding processability and improvement of solvent resistance can be obtained.

According to one embodiment of the present invention, there are provided an aromatic polysulfone and an aromatic polysulfone composition, each having a low halogen atom content and excellent heat resistance.

The method of the present invention for producing an aromatic polysulfone in another aspect thereof is a method for producing an aromatic polysulfone by a polycondensation reaction between an aromatic dihalogenosulfone compound and an aromatic dihydroxy compound, wherein: the polycondensation reaction is performed in the presence of at least one aromatic end-capping agent; an amount, p mol, of the aromatic dihalogenosulfone compound, an amount, q mol, of the aromatic dihydroxy compound, and an amount, r mol, of the aromatic end-capping agent have a relationship satisfying formula (S2) below and formula (S3) below; and the aromatic end-capping agent is a compound represented by the formula (9) above:

$$p > q \tag{S2, and}$$

$$0.5 \leq r/(p-q) \leq 1.5 \tag{S3}$$

In the formula (9), Y is —OH. That is, the aromatic end-capping agent is an aromatic monohydroxy compound.

The method of the present invention for producing an aromatic polysulfone in still another aspect thereof is a method for producing an aromatic polysulfone by a polycondensation reaction between an aromatic dihalogenosulfone compound and an aromatic dihydroxy compound, wherein: the polycondensation reaction is performed in the presence of at least one aromatic end-capping agent; an amount, p mol, of the aromatic dihalogenosulfone compound, an amount, q mol, of the aromatic dihydroxy compound, and an amount, r mol, of the aromatic end-capping agent have a relationship satisfying formula (S1) below; p/q is 1.2 or less; and the aromatic end-capping agent is a compound represented by the formula (9) above.

$$r/(p-q) < 2 \tag{S1}$$

In the formula (9), Y is —OH. That is, the aromatic end-capping agent is an aromatic monohydroxy compound.

The method of the present invention for producing an aromatic polysulfone in still another aspect thereof is a method for producing an aromatic polysulfone by a polycondensation reaction between an aromatic dihalogenosulfone compound and an aromatic dihydroxy compound, wherein: the polycondensation reaction is performed in the presence of at least one aromatic end-capping agent and an alkali metal carbonate; an amount, p mol, of the aromatic dihalogenosulfone compound, an amount, q mol, of the aromatic dihydroxy compound, and an amount, r mol, of the aromatic end-capping agent have a relationship satisfying formula (S1) below and formula (S2) below; and the aromatic end-capping agent is a compound represented by the formula (9) above:

$$r/(p-q) < 2 \tag{S1, and}$$

$$p > q \tag{S2}$$

In the formula (9), Y is —OH. That is, the aromatic end-capping agent is an aromatic monohydroxy compound.

The ratio of the alkali metal carbonate relative to the aromatic dihydroxy compound is 90 mol % or more and 130 mol % or less.

The aromatic polysulfone of the present invention in another aspect thereof is an aromatic polysulfone including repeating units represented by formula (1) below, and satisfying requirements (A) to (D) below:

$$-Ph^1-SO_2-Ph^2-O- \tag{1}$$

wherein each of $Ph^1$ and $Ph^2$ represents a phenylene group, and one or more hydrogen atoms of the phenylene group are each independently substituted by or not substituted by an alkyl group having 1 to 10 carbon atoms, an aryl group having 6 to 20 carbon atoms or a halogen atom;

(A): a halogen atom content is 1000 ppm by mass or less;
(B): the aromatic polysulfone has a yellowness index, YI, of not more than 20, as measured based on light transmission according to ASTM D 1925, and an absolute value of change in the yellowness index (ΔYI) caused by heating the aromatic polysulfone in air at 350° C. for 1 hour is 15 or less;
(C): the aromatic polysulfone has 0.2 to 0.6 phenolic hydroxyl group per 100 repeating units represented by the formula (1); and
(D): a change in melt viscosity (Δη) of the aromatic polysulfone when heated is 250 or less.

The aromatic polysulfone of the present invention in another aspect thereof is an aromatic polysulfone including repeating units represented by formula (1) below, and satisfying requirements (A) to (C) below:

$$-Ph^1-SO_2-Ph^2-O- \tag{1}$$

wherein each of $Ph^1$ and $Ph^2$ represents a phenylene group, and one or more hydrogen atoms of the phenylene group are each independently substituted by or not substituted by an alkyl group having 1 to 10 carbon atoms, an aryl group having 6 to 20 carbon atoms or a halogen atom;

(A): a halogen atom content is 1000 ppm by mass or less; and
(B): the aromatic polysulfone has a yellowness index, YI, of not more than 20, as measured based on light transmission according to ASTM D 1925, and an absolute value of change in the yellowness index (ΔYI) caused by heating the aromatic polysulfone in air at 350 ° C. for 1 hour is 13 or less; and
(C): a change in melt viscosity (Δη) of the aromatic polysulfone when heated is 250 or less.

EXAMPLES

Hereinbelow, the present invention will be described in more detail with reference to the Examples which, however, should not be construed as limiting the present invention. Various properties of the aromatic polysulfone were measured by the following methods.

<Measurement of Reduced Viscosity of Aromatic Polysulfone>

About 1 g of the aromatic polysulfone was dissolved in N,N-dimethylformamide so as to obtain 1 dL of a solution. The viscosity (η) of the resulting aromatic polysulfone solution was measured at 25° C. using an Ostwald type viscometer. In addition, the viscosity ($\eta_0$) of the solvent N, N-dimethylformamide was measured at 25° C. using the Ostwald type viscometer. From the viscosity (η) of the aromatic polysulfone solution and the viscosity ($\eta_0$) of N, N-dimethylformamide, the specific viscosity was calculated by the formula shown below. The reduced viscosity (unit: dL/g) of the aromatic polysulfone was calculated by dividing the specific viscosity by the concentration (unit: g/dL) of the aromatic polysulfone solution.

$$\text{Specific viscosity}=(\eta-\eta_0)/\eta_0$$

<Measurement of Number of Phenolic Hydroxyl Groups in Aromatic Polysulfone>

After dissolving a predetermined amount (unit: g) of the aromatic polysulfone in N,N-dimethylformamide, an excess amount of p-toluenesulfonic acid was added thereto, thereby neutralizing potassium phenoxide in the aromatic polysulfone into a phenolic hydroxyl group. With respect to the resulting solution, unreacted p-toluenesulfonic acid was neutralized with 0.05 mol/L of a solution of potassium methoxide in toluene and methanol (toluene/methanol=80/20 (v/v)) based on the total amount of the solution (L), using a potentiometric titrator ("COM-1700" manufactured by Hiranuma Sangyo Co., Ltd.). This revealed the number of moles of p-toluenesulfonic acid consumed in the reaction, and the number of moles of potassium phenoxide present in the aromatic polyether fine particles from the number of moles of the consumed p-toluenesulfonic acid. Further, the phenolic hydroxyl group was neutralized and the number of moles of the phenolic hydroxyl group was determined from the amount (unit: mol) of the potassium methoxide required for neutralization of the phenolic hydroxyl group. From the difference between the number of moles of the phenolic hydroxyl group and the number of moles of the potassium phenoxide, the number of moles of the phenolic hydroxyl group in the aromatic polysulfone of the predetermined amount (unit: g) was determined. The amount (unit: mol) of phenolic hydroxyl group per 1 g of the aromatic polysulfone was determined by dividing the number of moles of the phenolic hydroxyl group by the predetermined amount (unit: g) of the aromatic polysulfone. From the determined value, the number of phenolic hydroxyl groups per 100 repeating units of the aromatic polysulfone was determined.

<Measurement of Chlorine Atom Content of Aromatic Polysulfone>

A sample of the aromatic polysulfone (about 5 to 20 g) was burned in a combustion apparatus ("AQF-100" manufactured by Mitsubishi Chemical Analytech Co., Ltd.), and the generated gas was collected with absorbing liquid. The absorbing liquid was used as a test liquid and analyzed by ion chromatography ("ICS-2000" manufactured by Nippon Dionex K.K. or "Integrion" manufactured by Thermo Fisher Scientific K.K.) to determine the amount of chlorine in the absorbing liquid. From the determined amount of chlorine and the mass of the burnt aromatic polysulfone, the chlorine content (mg) per unit mass (1 kg) of the aromatic polysulfone was calculated.

<Measurement of Change in Yellowness Index (ΔYI) of Aromatic Polysulfone>

Under the following conditions, the yellowness index of the aromatic polysulfone was measured by transmitted light according to ASTM D 1925, and the obtained value was defined as $YI_1$. Next, after heating the aromatic polysulfone in air at 350° C. for 1 hour, the yellowness index was measured in the same manner as mentioned above, and the obtained value was defined as $YI_2$.

[Conditions]

Apparatus: Colorimetric color difference meter "ZE-2000" manufactured by Nippon Denshoku Industries Co., Ltd.

Sample: N-methyl-2-pyrrolidone solution containing an aromatic polysulfone at a concentration of 10% by mass Optical path length: 1 cm Measurement mode: 0°, 0° method according to CIE No 15: 2004 (JIS Z 8722)

Light source: Halogen lamp C light source

Viewing angle: 2°

[Procedure]

N-methyl-2-pyrrolidone was placed in a quartz cell having an optical path length of 1 cm at room temperature and installed in a sample chamber of Colorimetric Color Difference meter "ZE-2000" manufactured by Nippon Denshoku Industries Co., Ltd., whereafter a baseline was measured. Next, the sample was placed in a quartz cell having an optical path length of 1 cm and installed in a sample chamber of Colorimetric Color Difference meter "ZE-2000", whereafter YI was measured.

The relationship between YI and XYZ tristimulus values in the case of using the C light source satisfies the following equation.

$$YI=100(1.2769X-1.0592)/Y$$

From the obtained $YI_1$ and $YI_2$, the change in the yellowness index (ΔYI) was calculated by the following formula.

$$\Delta YI=YI_2-YI_1$$

<Method for Producing Aromatic Polysulfone Composition>

EXAMPLE 1

353.57 g of bis(4-chlorophenyl) sulfone, 300.36 g of bis(4-hydroxyphenyl) sulfone, 6.54 g of 4-phenylphenol and 579.93 g of diphenylsulfone were mixed and the temperature was raised to 180° C. while flowing nitrogen gas into the system. After adding 170.92 g of potassium carbonate to the resulting solution mixture, the temperature of the resulting mixture was gradually raised to 288° C. and, then, a reaction was carried out at 288° C. for 4 hours. Next, the obtained reaction mixture solution was cooled to room temperature to be solidified and finely pulverized, followed by washing the resultant several times by decantation and filtration using warm water and a mixed solvent of acetone and methanol. The obtained solids were heat-dried at 150° C. to obtain an aromatic polysulfone of Example 1.

With respect to the obtained aromatic polysulfone, the calculated value of r/(p−q) was 1.23, In the above "r/(p−q)", p is the blending amount (unit: mol) of the aromatic dihalogenosulfone compound, q is the blending amount (unit: mol) of the aromatic dihydroxy compound, and r is the blending amount (unit: mol) of the aromatic monohydroxy compound. With respect to these symbols, the same definitions apply to the following Example and Comparative Examples.

EXAMPLE 2

The same procedure as in Example 1 was repeated except that the amount of bis(4-chlorophenyl)sulfone was changed to 352.87 g, the amount of bis(4-hydroxyphenyl)sulfone was changed to 300.36 g, the amount of 4-phenylphenol was changed to 4.90 g, the amount of diphenylsulfone was changed to 578.96 g, and the amount of potassium carbonate was changed to 170.83 g, to thereby obtain an aromatic polysulfone of Example 2.

With respect to the obtained aromatic polysulfone, the calculated value of r/(p−q) was 1.00.

Comparative Example 1

The same procedure as in Example 1 was repeated except that the amount of bis(4-chlorophenyl)sulfone was changed to 104.43 g, the amount of bis(4-hydroxyphenyl)sulfone was changed to 90.11 g, the amount of 4-phenylphenol was changed to 1.23 g, the amount of diphenylsulfone was changed to 172.68 g, and the amount of potassium carbonate was changed to 50.30 g, to thereby obtain an aromatic polysulfone of Comparative Example 1.

With respect to the obtained aromatic polysulfone, the calculated value of r/(p−q) was 2.00.

Comparative Example 2

46.42 g of bis(4-chlorophenyl)sulfone, 40.04 g of bis(4-hydroxyphenyl)sulfone, 23.22 g of potassium carbonate and 160 g of sulfolane were mixed and allowed to react at 235° C. for 5 hours. Next, the obtained reaction mixture solution was diluted with sulfolane and cooled to 80° C. to precipitate unreacted potassium carbonate and by-produced potassium chloride. These inorganic salts were removed by filtration, and the resulting solution was dripped into methanol to precipitate the aromatic polysulfone. Then, unnecessary sulfolane was removed by filtration to obtain a precipitate. The obtained precipitate was thoroughly washed repeatedly with methanol and dried by heating at 150° C. to obtain an aromatic polysulfone of Comparative Example 2.

With respect to the obtained aromatic polysulfone, the calculated value of r/(p−q) was 2.00.

<Evaluation of Heat Resistance>

[Measurement of 5% Weight Loss Temperature of Aromatic Polysulfone]

Using a thermogravimetric analyzer ("TGA-50" manufactured by Shimadzu Corporation), a sample (about 10 mg) of the aromatic polysulfone was heated up to 800° C. at a temperature elevation rate of 10° C./min, and burned. From the TGA curve obtained at this time, the temperature at the time when the weight of the sample was decreased by 5% on the basis of 400° C. was determined, and this temperature was defined as the 5% weight loss temperature (° C.).

[Measurement of Change in Melt Viscosity (Δη) of Aromatic Polysulfone]

The aromatic polysulfone products, which had been heated at 360° C. for 5 minutes and 30 minutes, respectively, were extruded from a split die (inner diameter 1 mm, length 10 mm) under a load of 50 kg/cm², and the melt viscosities of the extruded aromatic polysulfone products were measured with a thermal flow evaluation device ("Flow Tester Model CFT 500" manufactured by Shimadzu Corporation). The melt viscosity of the aromatic polysulfone heated at 360° C. for 5 minutes was defined as $\eta_1$, and the melt viscosity of the aromatic polysulfone heated at 360° C. for 30 minutes was defined as $\eta_2$. Based on the determined $\eta_1$ and $\eta_2$, the change in the melt viscosity (Δη) was calculated by the following formula.

$$\Delta\eta = \eta_2 - \eta_1$$

With respect to the aromatic polysulfone obtained in each of the Examples and Comparative Examples, the results of measurement of the reduced viscosity, the 5% weight loss temperature, the halogen atom content, the change in melt viscosity (Δη), and the change in yellowness index (ΔYI) are shown in Table 1.

TABLE 1

| | r/(p − q) | Reduced viscosity (dL/g) | Halogen atom content (ppm) | Phenolic hydroxyl group content (number of phenolic hydroxyl group/100 repeating units of aromatic polysulfone) | $YI_1$ | ΔYI | 5% weight loss temperature (° C.) | Δη (Pa · s) |
|---|---|---|---|---|---|---|---|---|
| Example 1 | 1.23 | 0.415 | 900 | 0.54 | 9.52 | 10.41 | 528 | 98 |
| Example 2 | 1.00 | 0.492 | 680 | 0.27 | 18.71 | 6.77 | 530 | 149 |
| Comparative Example 1 | 2.00 | 0.439 | 600 | 1.12 | 11.51 | 18.68 | 523 | 327 |
| Comparative Example 2 | 2.00 | 0.419 | 600 | 1.16 | 28.41 | 24.34 | 513 | 280 |

As apparent from the results shown in Table 1, the halogen atom content of the aromatic polysulfone was not more than 900 ppm in each of the Examples and Comparative Examples. The aromatic polysulfone of each of Example 1 and Example 2 had ΔYI of not more than 15, and hence had high 5% weight loss temperature and excellent heat resistance.

On the other hand, the aromatic polysulfone of each of Comparative Example 1 and Comparative Example 2 had ΔYI of more than 15, and hence had low 5% weight loss temperature and poor heat resistance. That is, the aromatic polysulfone each of Example 1 and Example 2 had excellent heat resistance while having a halogen content suppressed to a low level.

Further, in the aromatic polysulfone of each of Examples 1 and 2, increase in the melt viscosity was suppressed as compared to the aromatic polysulfone of each of Comparative Examples 1 and 2. This indicates that reactions caused by the radicals are suppressed in the aromatic polysulfone of the present invention; therefore, the aromatic polysulfone of the present invention can be regarded as being unlikely to suffer deterioration reactions caused by radicals even at high temperature.

The above results confirmed that the present invention is useful.

INDUSTRIAL APPLICABILITY

The present invention can provide a method for producing an aromatic polysulfone having a low halogen atom content and excellent heat resistance.

The invention claimed is:

1. A method for producing an aromatic polysulfone by a polycondensation reaction between an aromatic dihalogenosulfone compound and an aromatic dihydroxy compound, wherein:
the polycondensation reaction is performed in the presence of at least one aromatic end-capping agent; and
an amount, p mol, of the aromatic dihalogenosulfone compound, an amount, q mol, of the aromatic dihydroxy compound, and an amount, r mol, of the aromatic end-capping agent have a relationship satisfying formula (S2) below and formula S3 below:

$$p > q \quad (S2)$$

$$0.5 \leq r/(p-q) \leq 1.5 \quad (S3)$$

wherein the aromatic end-capping agent is represented by formula (8):

$$Ar\text{—}Y \quad (8)$$

wherein Y represents —OH, —SH, or NH$_2$ and Ar represents an aromatic group, and
wherein the aromatic dihydroxy compound is at least one compound selected from the group consisting of compounds represented by the formulas (5) to (7), $$HO\text{—}Ph^1\text{—}SO_2\text{—}Ph^2\text{—}OH \quad (5)$$

wherein Ph$^1$ and Ph$^2$ represents a phenylene group, and one or more hydrogen atoms of the phenylene group are each independently optionally substituted by an alkyl group having 1 to 10 carbon atoms, an aryl group having 6 to 20 carbon atoms, or a halogen atom, $$HO\text{—}Ph^3\text{—}R^1\text{—}Ph^4\text{—}OH \quad (6)$$

wherein Ph$^3$ and Ph$^4$ represents a phenylene group, and one or more hydrogen atoms of the phenylene group are each independently optionally substituted by an alkyl group having 1 to 10 carbon atoms, an aryl group having 6 to 20 carbon atoms, or a halogen atom; and R$^1$ is an alkylidene group having 1 to 5 carbon atoms, an oxygen atom or a sulfur atom, $$HO\text{—}(Ph^5)_n\text{—}OH \quad (7)$$

wherein Ph$^5$ represents a phenylene group, and one or more hydrogen atoms of the phenylene group are each independently optionally substituted by an alkyl group having 1 to 10 carbon atoms, an aryl group having 6 to 20 carbon atoms, or a halogen atom; and n is an integer of 1 to 3, with the proviso that, when n is 2 or more, a plurality of Ph$^5$ is the same or different.

2. The method according to claim 1, wherein the aromatic dihalogenosulfone compound is bis(4-chlorophenyl)sulfone.

3. The method according to claim 2, wherein the polycondensation reaction is carried out in a presence of an organic solvent comprising diphenylsulfone.

4. The method according to claim 1, wherein the polycondensation reaction is carried out in a presence of an organic solvent comprising diphenylsulfone.

5. An aromatic polysulfone comprising repeating units represented by formula (1) below, and satisfying requirements (A) and (B) below:

$$\text{—}Ph^1\text{—}SO_2\text{—}Ph^2\text{—}O\text{—} \quad (1)$$

wherein each of Ph$^1$ and Ph$^2$ represents a phenylene group, and one or more hydrogen atoms of the phenylene group are each independently substituted by or not substituted by an alkyl group having 1 to 10 carbon atoms, an aryl group having 6 to 20 carbon atoms or a halogen atom;
wherein the aromatic polysulfone contains the repeating units (1) in an amount of 80 mol % or more relative to the total number of moles of all repeating units constituting the aromatic polysulfone,
(A): a halogen atom content is 1000 ppm by mass or less; and
(B): the aromatic polysulfone has a yellowness index, YI, of not more than 20, as measured based on light transmission according to ASTM D 1925, and an absolute value of change in the yellowness index (ΔYI) caused by heating the aromatic polysulfone in air at 350° C. for 1 hour is 15 or less.

6. The aromatic polysulfone according to claim 5, wherein the halogen atom is a chlorine atom.

7. The aromatic polysulfone according to claim 6, which has 0.01 to 0.8 phenolic hydroxyl group per 100 repeating units represented by the formula (1).

8. An aromatic polysulfone composition comprising the aromatic polysulfone according to claim 6 and a filler.

9. The aromatic polysulfone according to claim 5, which has 0.01 to 0.8 phenolic hydroxyl group per 100 repeating units represented by the formula (1).

10. An aromatic polysulfone composition comprising the aromatic polysulfone according to claim 9 and a filler.

11. An aromatic polysulfone composition comprising the aromatic polysulfone according to claim 5 and a filler.

* * * * *